Nov. 6, 1928.
C. P. SEYLER
1,690,596
INSULATOR PIN
Filed May 14, 1925
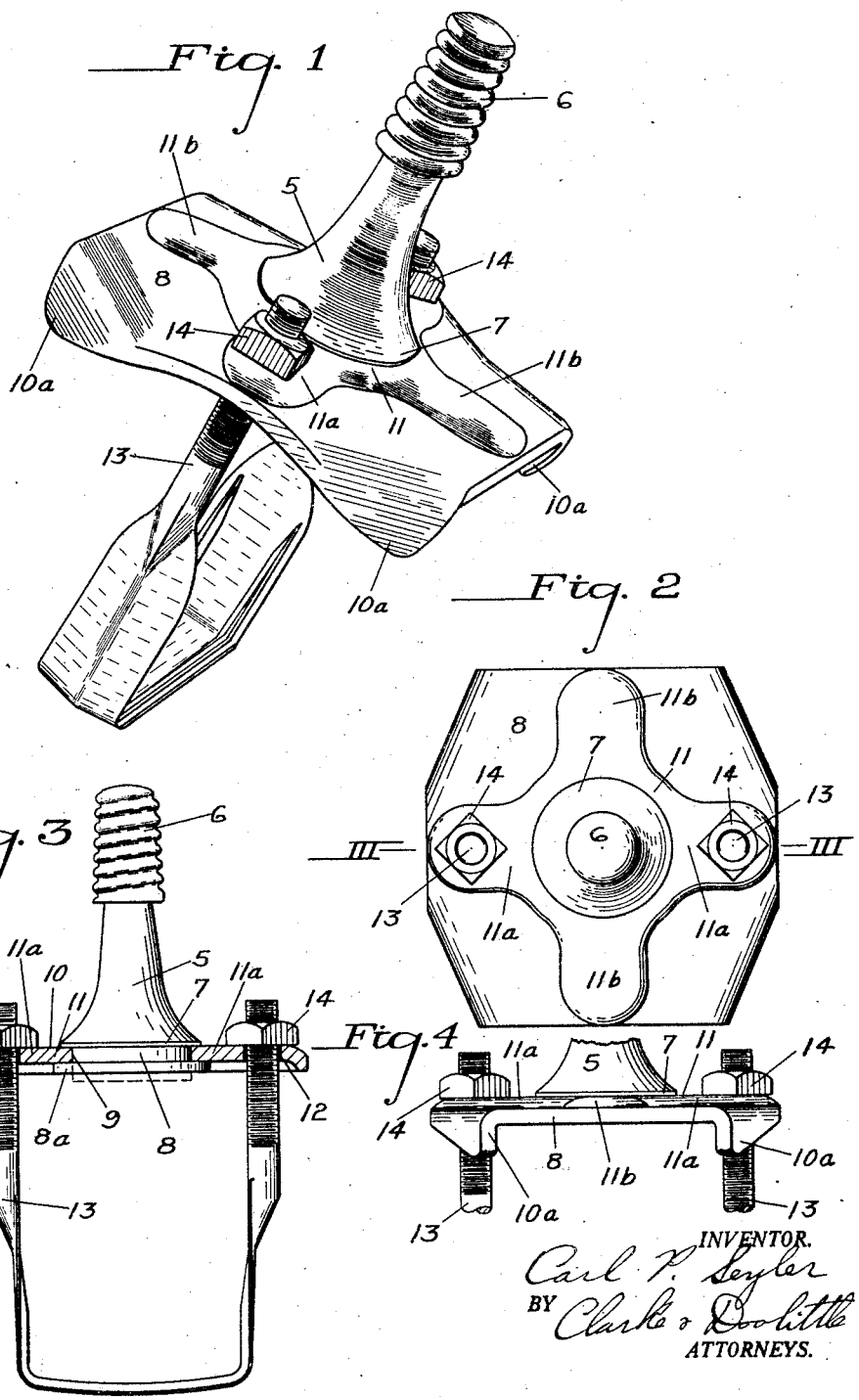
INVENTOR.
Carl P. Seyler
BY Clarke & Doolittle
ATTORNEYS.

Patented Nov. 6, 1928.

1,690,596

UNITED STATES PATENT OFFICE.

CARL P. SEYLER, OF PITTSBURGH, PENNSYLVANIA.

INSULATOR PIN.

Application filed May 14, 1925. Serial No. 30,185.

This invention is for an improvement in insulator pins of the type used in electric power wiring on poles and the like.

With the usual insulator pin, it is necessary to provide a hole in the cross arm through which the stem of the pin passes. This is not only laborious, but is frequently hazardous work, where the pin is to be applied to an erected pole and arm. It also reduces the strength of the cross arm so bored, and a heavy pull on the insulator is apt to result in breaking or splitting of the cross arm.

Some constructions have been devised whereby the pin may be clamped to the cross arm without requiring it to be drilled, and it is to that type of support that the present invention relates.

This invention has for its principal objects to provide a pin construction adapted to be clamped to a cross arm or the like which is strong and rugged, which may be cheaply manufactured, and which has an improved saddle plate to seat the pin on the cross arm.

The invention may be readily understood by reference to the accompanying drawings, in which:

Fig. 1 is a perspective view of the pin unit;
Fig. 2 is a top plan view thereof;
Fig. 3 respresents a transverse vertical section in the plane of line III—III of Fig. 2; and
Fig. 4 is an end view of the saddle plate.

In the drawings, 5 designates the shank of an insulator pin which is preferably formed of malleable or workable iron or steel, as distinguished from cast metal, and which has a threaded upper end portion 6 for the reception of an insulator. The lower portion of the pin preferably widens or increases in diameter, forming a shoulder 7, beyond which extends part 8, originally of reduced diameter, but upset as hereinafter described.

The end 8 of the pin is passed through a central hole 9 in a saddle plate 10, which is also preferably formed of malleable metal. This plate has an upwardly pressed boss or central portion 11, from which radiate the embossed lateral and longitudinal strengthening ribs 11ª and 11ᵇ respectively. With this arrangement, the under surface of the plate has a central recess. The end portion 8 of the pin, projecting through the base, is swedged or upset, as designated at 8ª, to securely hold the pin in the saddle plate. Due to the fact that the under surface of the plate is recessed, the upset end of the pin may be flush with the under surface of the plate, thereby enabling the plate to have an even seat on a cross pin or other structure.

The saddle plate 10 is preferably of original rectangular shape, but the corners 10ª thereof are bent downwardly to provide lugs to engage the sides of a cross-arm when the saddle is seated thereon.

At each side of the pin, in the outer end of each of the lateral ribs, is a hole 12 through which the ends of a clamping or U-bolt 13 pass. Each of the ends of the U-bolt may carry the usual adjusting nuts 14. The U-bolt is adapted to embrace the cross-arm or structure on which the pin is to be placed, and serves to hold the saddle plate on the cross bar. The turned down corners 10ª engage the cross-arm to prevent the saddle from turning and the pin is securely held in place.

The device as thus constructed can be easily and cheaply made, and can be quickly and easily put into use. By forming the saddle plate in the manner disclosed, with the turned down corners, the plate has sufficient width at its center to receive the ends of the U-bolt, while the downward bending of the corners, in effect, forms lugs which are the same distance apart as the spread of the U-bolt, so that both the U-bolt and these turned down lugs have a tight fit over a standard size cross-arm.

I claim as my invention:

An insulator pin construction including a saddle plate of rectangular form having its corners bent to provide cross-arm engaging means and its central portion pressed out to form a central apertured seat portion and laterally and longiudinally extending strengthening ribs, a pin extending through the apertured seat portion having fastening means thereon in contact with each face of the plate and between which the plate is held, said laterally extending ribs each formed with a bolt receiving opening.

In testimony whereof I affix my signature.

CARL P. SEYLER.